Figure 1:
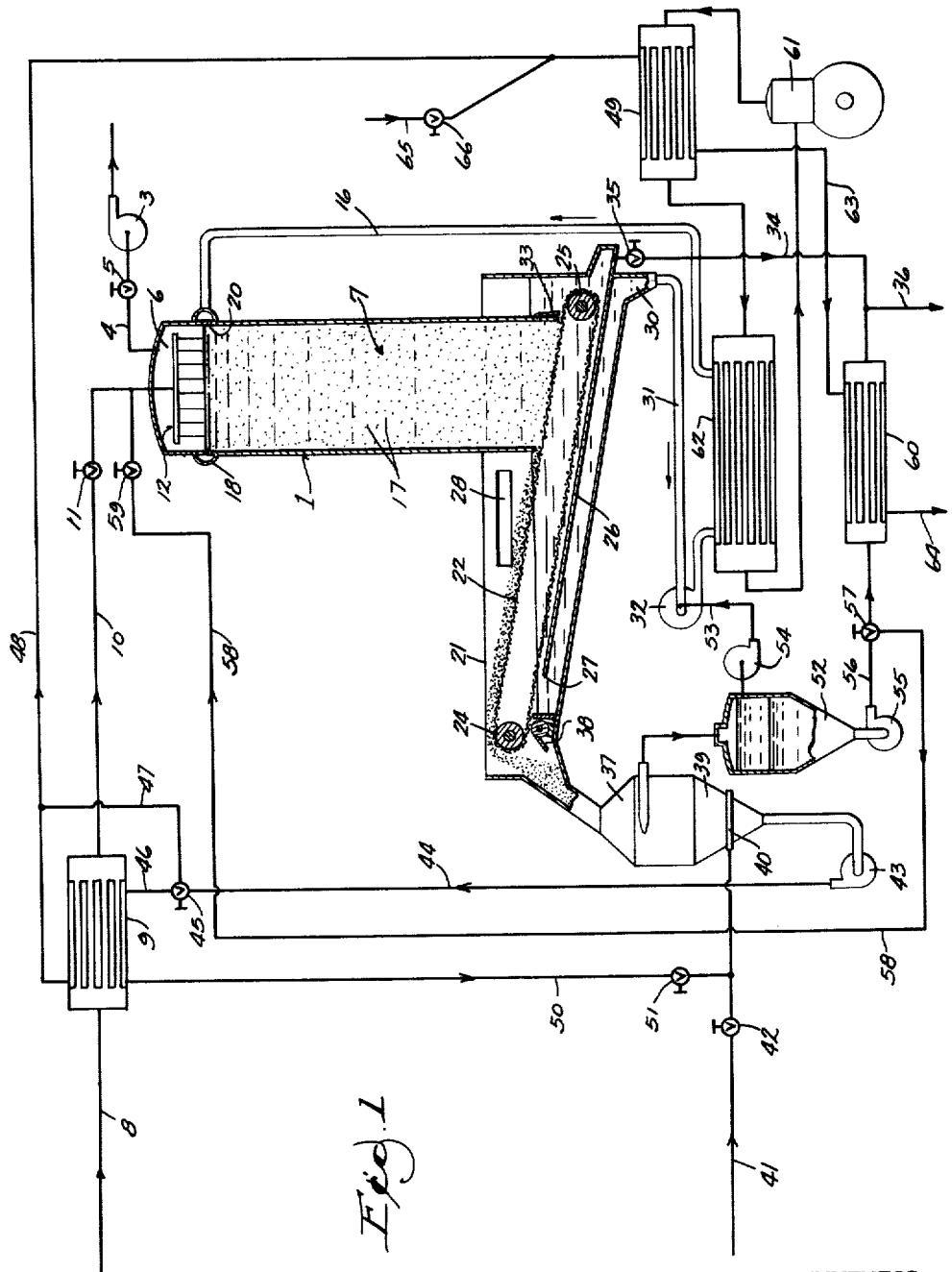

July 23, 1963  H. H. CLARK  3,098,735
ART OF SEPARATING WATER FROM AQUEOUS LIQUIDS
Filed Feb. 12, 1962  5 Sheets-Sheet 1

INVENTOR.
HERBERT H. CLARK
BY
Lieber, Lieber & Nilles

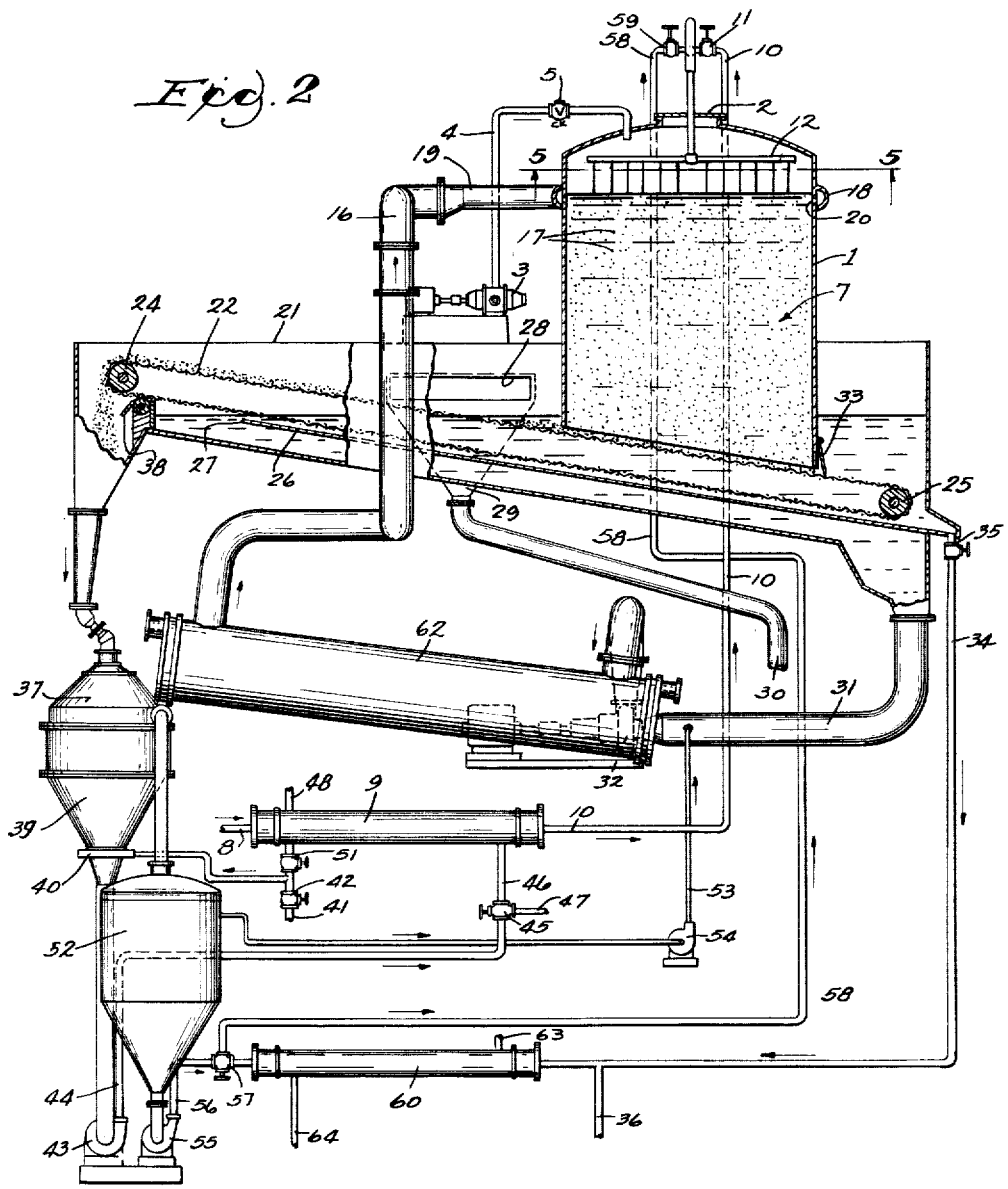

July 23, 1963 H. H. CLARK 3,098,735
ART OF SEPARATING WATER FROM AQUEOUS LIQUIDS
Filed Feb. 12, 1962 5 Sheets-Sheet 3
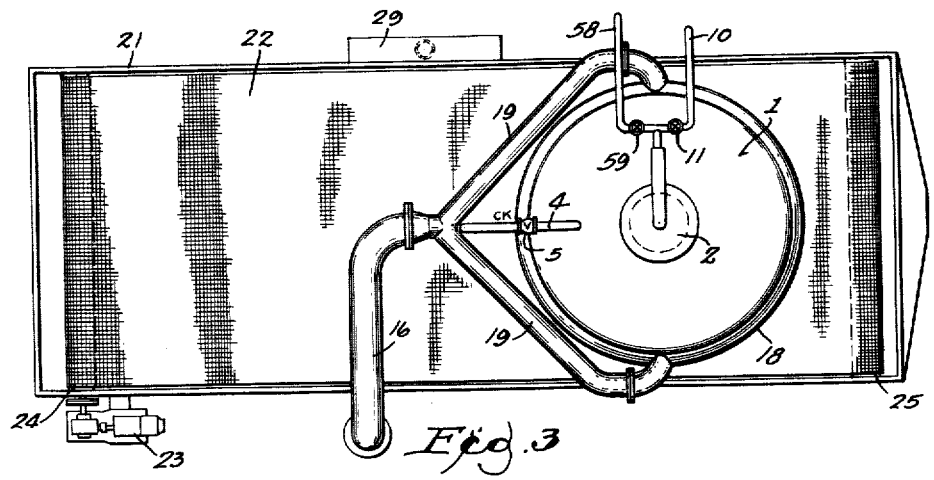
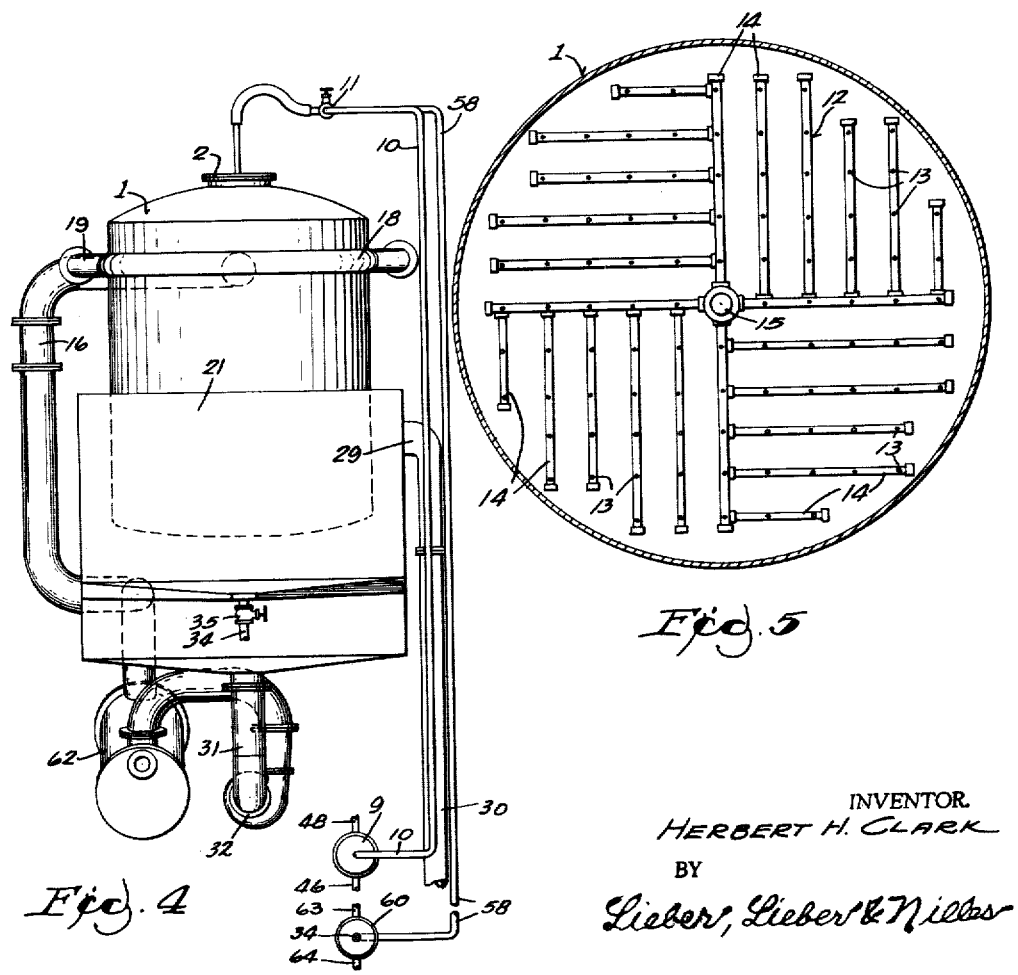
INVENTOR.
HERBERT H. CLARK
BY
Lieber, Lieber & Nilles July 23, 1963  H. H. CLARK  3,098,735
ART OF SEPARATING WATER FROM AQUEOUS LIQUIDS
Filed Feb. 12, 1962  5 Sheets-Sheet 4

INVENTOR.
HERBERT H. CLARK
BY
Lieber, Lieber & Nilles

United States Patent Office 3,098,735
Patented July 23, 1963

3,098,735
ART OF SEPARATING WATER FROM
AQUEOUS LIQUIDS
Herbert H. Clark, Oshkosh, Wis., assignor to Appleton
Wire Works Corp., Appleton, Wis., a corporation of
Wisconsin
Filed Feb. 12, 1962, Ser. No. 172,623
21 Claims. (Cl. 62—58)

The present invention relates generally to improvements in the art of treating aqueous liquids such as chemical liquors in order to separate ingredients thereof, and it relates more specifically to improved methods of and apparatus for separating water from aqueous liquids of various kinds by refrigeration; and this application is a continuation-in-part of my prior application Serial No. 683,409, filed September 11, 1957, and my co-pending applications Serial No. 10,510, filed February 23, 1960, and Serial No. 133,998, filed August 25, 1961, all of which have now been abandoned.

The primary object of this invention is to provide an effective method of treating aqueous liquids in order to separate out water and to further provide improved apparatus for the treatment.

While the broad idea of effecting separation of water from aqueous liquids, such as spent sulphite liquor derived from paper mill digesters, saline or brackish water, fruit juices, and the like, by refrigeration has heretofore been proposed, these prior proposals are not believed to have proven entirely satisfactory for treating large quantities of the liquid, either because they do not produce pure water which is uncontaminated, or because the cost of separating the water is excessive, or because excessively large and complicated equipment is required to exploit the method, or because the separation cannot be effected rapidly and automatically.

It is therefore an important object of the present invention to provide a commercial refrigeration method of separating the ingredients of aqueous liquids in a manner whereby the end product, which may be water or a concentrate, can be obtained at a relatively low cost in substantial quantities.

Another important object of this invention is to provide improved apparatus for practicing the new refrigeration method automatically and in a reliable manner.

It is another object of this invention to operate a refrigeration method of separating water in which the water freezing medium has a minimal temperature differential between its low temperature before extracting heat from the water and its high temperature after heat extraction.

It is another object of this invention to provide a refrigeration method of separating water from an aqueous liquid in which the liquid is brought into direct contact with a freezing medium that is in a liquid state throughout the process.

Another object of the invention is to have a vessel in which freezing occurs that has smooth surfaces without appurtenances therein to eliminate unwanted collections of ice that may impede operation.

These and other objects and advantages of the invention will be apparent from the description that follows. In the usual practice of the invention a water-immiscible liquid is circulated through a freezing zone as a stream at a temperature below the freezing point of water to act as a cold carrier for the aqueous liquid to be treated, and hereinafter such water-immiscible liquid will also be referred to as a carrier. The aqueous liquid, which comprises water together with a solids content, is fed into the stream of cold carrier in lesser amounts to be engulfed by the carrier and to have the carrier readily absorb heat from the aqueous liquid. This extraction of heat is quite rapid and ice particles are quickly formed from the water of the aqueous liquid, such particles and the resulting liquid concentrate being distributed within and flowing along with the carrier through the freezing zone. The resulting mixture is heterogeneous in character, and the constituents are separated from one another after the ice particles are formed. Since the time for ice formation is brief, and since the water-immiscible characteristic of the carrier permits an immediate separation, the carrier can be recirculated without any substantial heat absorption, other than the heat intake required for producing the ice particles.

The carrier is preferably recooled before returning to the freezing zone by passing through an evaporator of an associated refrigeration apparatus. To enhance the efficiency of the process the ice produced may be utilized to cool incoming aqueous liquid and the refrigerant of the associated refrigeration apparatus. Therefore, the overall operating efficiency for the invention can be relatively great, due to the factors of both small temperature differential for the carrier and use of the ice product as a cooling medium.

The cold carrier should have a different density, or a specific gravity, than ice and liquid concentrate, preferably less, in order to prevent the ice particles and liquid concentrate from rising to the surface of the mixture, or prematurely separating out. Although the mixture of carrier, ice and liquid concentrate may be caused to flow in any direction, commercial practice may be facilitated by circulating the cold carrier through a freezing zone that is in the form of a descending stream or column to which the aqueous liquid is admitted from above. The aqueous liquid is then injected into the carrier as a spray from nozzles spaced above the top of the column, and the ice particles and liquid concentrate are entrained and carried downward with the descending flow of cold carrier, to be delivered at the lower end of the column for subsequent separation.

A more detailed description of the steps involved in the practice of the improved method, and of the construction and operation of several types of novel apparatus of the invention will now be had by reference to the drawings accompanying and forming a part of this specification, in which drawings like reference characters designate the same or similar parts in the various views.

In the drawings:

FIG. 1 is a part-sectional flow diagram for use in illustrating and describing the structure and methods employed in the apparatus shown in FIGS. 2–5, and the diagram sets forth an installation embodying improved apparatus for a practical exploitation of the improved method wherein the advancing body of cold water-immiscible carrier liquid comprises a descending column subjected to a vacuum at its upper end.

Figure 6:
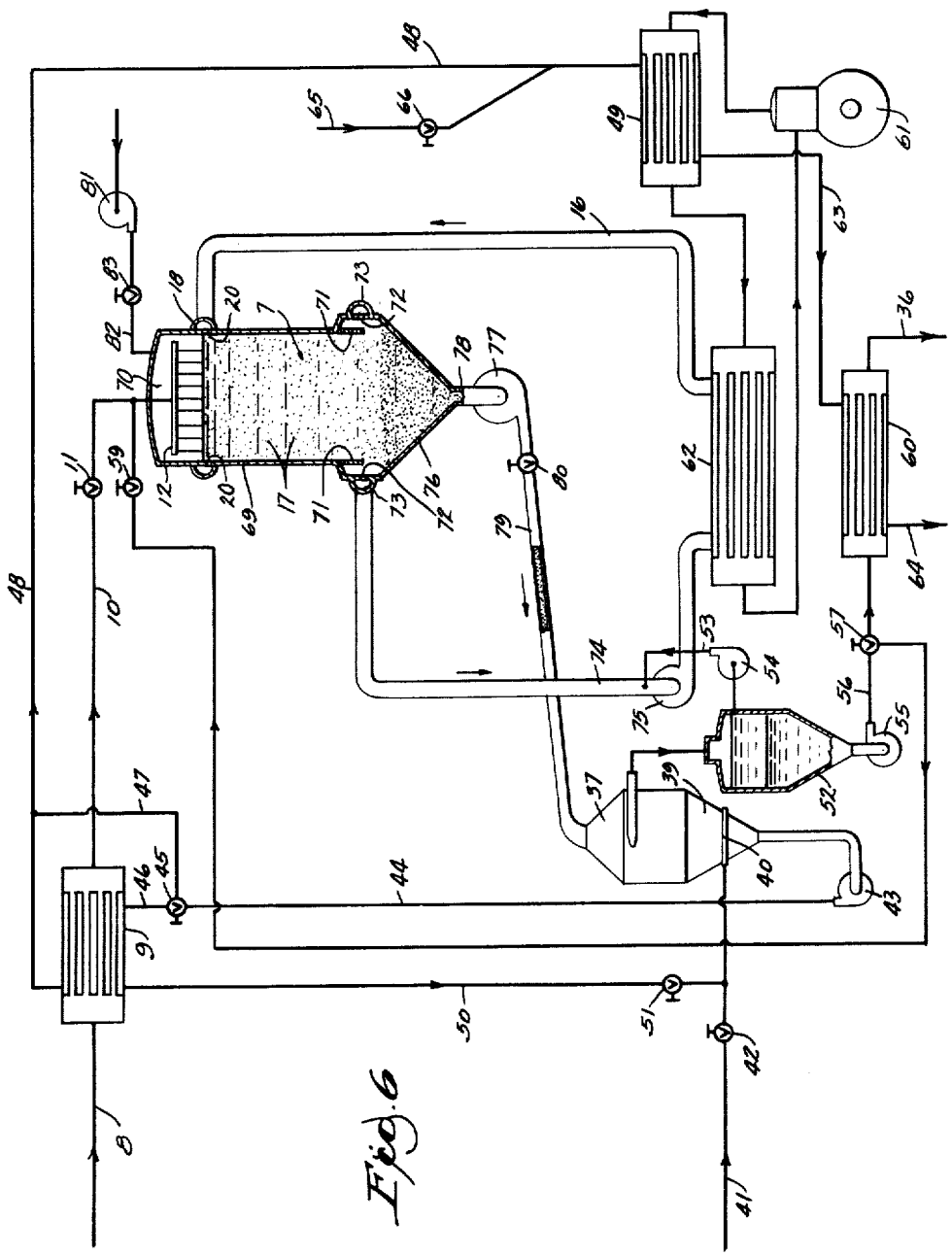
Figure 7:
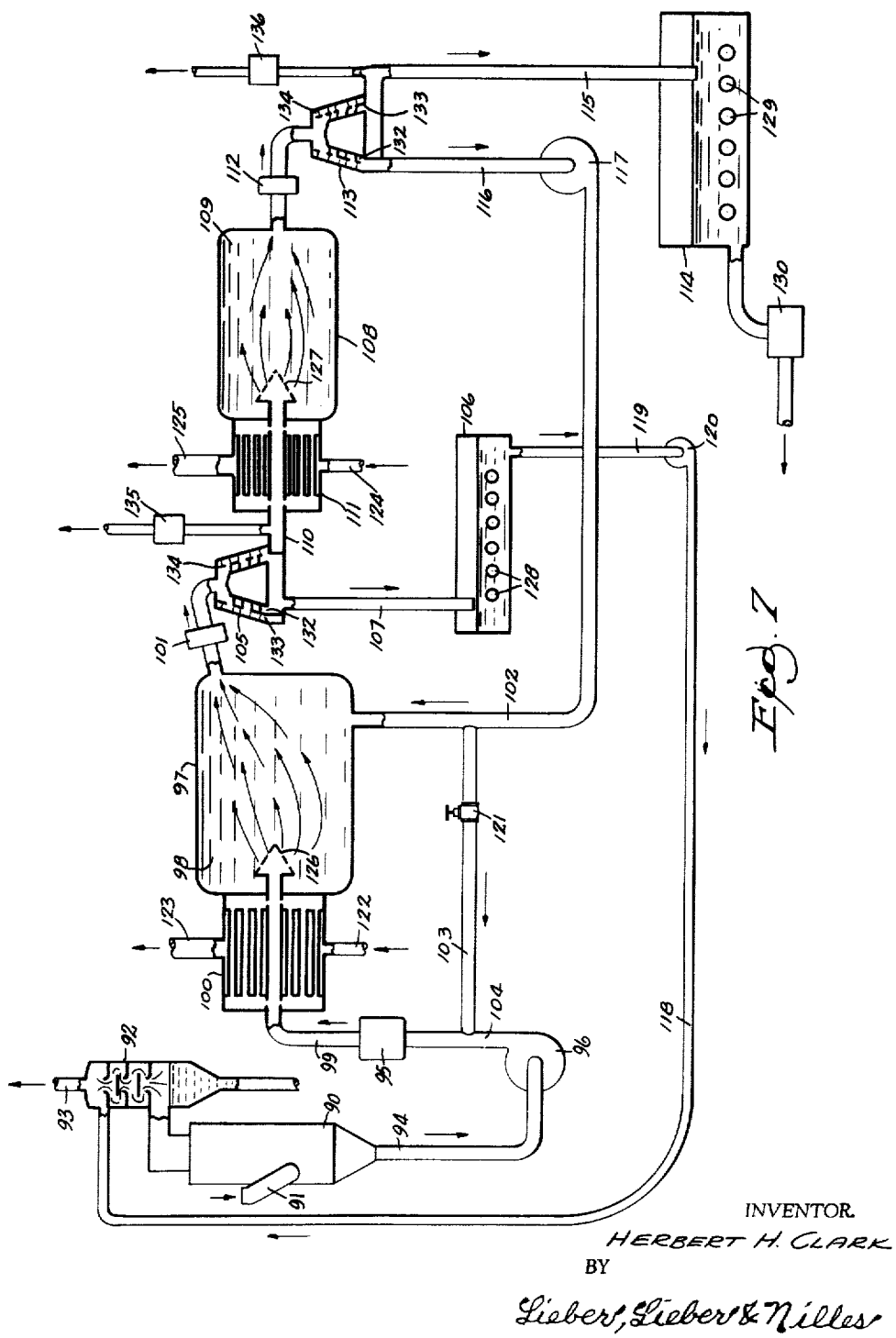

FIG. 2 is a part-sectional side view of apparatus for an actual plant built in accordance with the flow diagram of FIG. 1, but with the refrigeration equipment and some of the connecting pipes omitted for the sake of clarity, the section having been taken centrally and vertically through a water congealing or freezing zone and through a conveyor belt separator, FIG. 3 is a top view of the installation shown in FIG. 2, FIG. 4 is an end view of the same installation, FIG. 5 is an enlarged bottom view of a nozzle assembly for delivering aqueous liquid into the freezing zone, taken through the plane 5—5 shown in FIG. 2, FIG. 6 is a part-sectional flow diagram of a modified form of apparatus for carrying on the steps of the improved method, but wherein the advancing descending column of cold carrier may be subjected to pressure, and alternative means are used for separating the major portion of the cold carrier from the other ingredients of the mixture, and FIG. 7 is a part-sectional flow diagram for a further modified form of apparatus for practicing the invention in which the aqueous liquid is treated in successive stages.

Referring now particularly to FIGS. 1–5, inclusive, the novel apparatus shown therein, which is adapted to carry on the steps of the method of the invention, has an upright circular cylindrical vessel 1 open at its lower end and sealed closed at its top by a cover 2, which cover 2 is shown in the more detailed views of FIGS. 2–4. A vacuum pump 3, shown in FIGS. 1 and 2, communicates with the upper interior of the vessel 1 by an air line 4 having a control valve 5, and as will hereinafter be explained the liquid mixture in the vessel 1 is maintained as a column 7 with its upper level beneath the top of the vessel 1 to present a space 6 in the top of the vessel 1. The pump 3 maintains this space 6 under sub-atmospheric pressure for the purpose of holding the liquids in such column.

An aqueous liquid intake line 8, shown at the upper left in FIG. 1 and at the middle left in FIG. 2, is provided for conducting liquid to be treated into an initial cooler 9, from which the liquid flows through an inlet feed line 10 and a control valve 11 to a spray assembly 12 located in the partial vacuum space 6. The spray assembly 12 is shown from its underside in FIG. 5, and it is preferably a multiple jet assemblage having numerous openings 13 in several arms 14 radiating from a central feeder hub 15, so as to overhang nearly the entire surface area of the liquid column 7 established in the vessel 1. The aqueous liquid is thus introduced as a spray in the form of relatively fine jets that fall through the space 6. By spacing the nozzle assembly 12 above the liquid level excessive formation and accumulation of ice on the assembly is precluded, and by having the spray in the form of fine continuous jets the aqueous liquid is introduced into the column 7 in a state that enhances ice particle growth. Also, distribution of the spray over the entire surface of the liquid column 7 makes most efficient use of the cross section area of the vessel 1.

A large diameter conduit 16, see FIGS. 2–4 for an illustration of relative size, for delivering a pre-cooled water-immiscible carrier liquid, such as mineral oil, highly refined kerosene, or the like, in quantities considerably greater than the feed rate of the aqueous liquid connects with the upper portion of the vesseel 1 to produce the descending liquid column 7 hereinbefore referred to. The column 7 is maintained at a temperature below the freezing point of water, so as to convert at least some of the water of the aqueous liquid entering the column 7 from the spray assembly 12 into ice particles 17, which as seen in FIGS. 1 and 2 are mixed throughout and descend with the cold carrier. It is desirable to avoid excessive agitation or turbulence of the cold water-immiscible carrier, as it enters and descends through the freezing zone of the column 7, to promote proper ice crystal growth and to avoid possible emulsification of the incoming aqueous liquid. To this end, the carrier is preferably delivered from the conduit 16 into the vessel 1 through an annular manifold 18 surrounding the vessel 1 at approximately the height of the liquid level therein, as seen in FIGS. 1–4. In the actual application of FIGS. 2–5 the conduit 16 is subdivided into two short smaller diameter conduits 19 that enter the manifold 18 at diametrical opposite sides of the vessel 1. The portion of the vessel wall surrounded by the manifold 18 has a large number of circumferentially spaced injection orifices 20 that are individually quite small, so that the flow of the carrier through each is relatively gentle. The total flow, however, is of a large volume capable of maintaining a continually descending stream of the cold carrier within the vessel 1.

Located beneath the lower open end of the vessel 1 is a horizontally extending tank 21 for receiving the fluent mixture descending from the freezing zone of the column 7, and as illustrated in FIGS. 1 and 2, the open lower end of the vessel 1 is submerged beneath the liquid level in the tank 21. Atmospheric pressure acting upon the surface of the liquid within the tank 21 thus urges the liquid to stand as the column 7 in the vessel 1 when a vacuum is drawn by the pump 3. A change in vacuum will alter the column height, and for usual operation the liquid level is held slightly above the orifices 20 to minimize agitation and turbulence. As viewed from the top, see FIG. 3, the tank 21 is of rectangular configuration, and placed in the tank 21 is an endless, fine-mesh, wire screen belt conveyor 22. The belt conveyor 22 is inclined with its lower end disposed directly beneath and completely spanning the open bottom of the vessel 1. The upper end of the belt conveyor 22 projects outwardly beyond and above the liquid level within the tank 21, and to drive the conveyor 22 a motor 23 is mounted outside the tank 21 in driving relation to the upper roll 24 about which the conveyor 22 travels. The conveyor 22 is driven so that its upper side, or run, travels upwardly out of the liquid, and the tail roll 25 at the lower end of the conveyor 22 is merely an idle roll which is suitably journaled in the walls of the tank 21.

An elongated partition 26 inclined parallel to and disposed directly beneath the lower run of the belt conveyor 22 forms a floor within the tank 21, and its raised left hand end, as viewed in FIGS. 1 and 2, constitutes a submerged weir 27 within the tank 21 over which the cold carrier flows. In the event a malfunction occurs, in which the liquid column 7 suddenly falls and the tank 21 is flooded with an oversupply of liquids, such oversupply is by-passed through an overflow opening 28 in the side wall of the tank 21 above the normal operational liquid level. The opening 28 leads into a funnel like drain 29, as shown in FIGS. 2 and 4, that connects to a discharge pipe 30 leading to a suitable reservoir, not shown.

The mesh of the belt conveyor 22 should permit the cold carrier to pass directly therethrough, so as to flow over the weir 27 and hence downwardly beneath the partition 26 into a large return conduit 31 that leads to a circulation control pump 32. The mesh of the belt conveyor should also be fine enough to collect the ice particles and concentrated aqueous liquid, so as to screen out these constituents from the flow of cold carrier and deliver them to the top of the conveyor 22. A barrier 33 may be provided between the lower end of the vessel 1 and the lower portion of the upper run of the belt conveyor 22, in order to prevent accumulation of ice and liquid concentrate in the space below the conveyor 22, and a drain line 34 including a valve 35 for effecting periodic removal of any such accumulation and for conducting the same into a final liquid concentrate outlet pipe 36 may be provided, as shown in FIGS. 1, 2 and 4.

Ingredients removed from the tank 21 by the belt conveyor 22 are delivered by gravity into a centrifuge 37, see FIGS. 1 and 2, and the belt conveyor 22 is cleaned by a doctor unit 38 after it passes the upper roll 24. The centrifuge 37 may be of known construction and one is selected that will effectively separate the ice particles 17 from the liquid concentrate and from the small amounts of carrier that may have adhered to the ice and liquid concentrate. The ice particles 17 are delivered into a cone 39 at the bottom of the centrifuge 37 which is provided with a fresh water spray ring 40 to which sufficient water may be delivered through a supply pipe 41 and a control valve 42 to wash out the particles 17 and to convert them into a slush, or an ice slurry, capable of being transported by a pump 43. The pump 43 communicates with the inlet end of an ice conveying pipe 44 connecting at its opposite end with a three way control valve 45. When the valve 45 is opened in one direction it connects the ice conveying pipe 44 to an inlet pipe 46 for the initial cooler 9, and when it is opened in the alternative direction it connects the ice conveying pipe 44 through a diverter pipe 47 to an outlet pipe 48 of the initial cooler 9. Thus, when the aqueous liquid feeding into the system through the intake line 8 is relatively warm the valve 45 is positioned to have the ice slurry flow through the initial cooler 9 to reduce the temperature of the incoming aqueous liquid to near the freezing point of water. But, if the incoming feed of aqueous liquid is at a sufficiently low temperature, due to extended exposure to a cold ambient, the valve 45 may be adjusted to cause some or all of the ice slurry to by-pass the initial cooler 9 through the diverter pipe 47. In either case the ice slurry will be delivered through the outlet pipe 48 to a condenser 49, which constitutes part of the refrigeration system for cooling the water-immiscible carrier that is circulated through the vessel 1.

In order to reduce the amount of fresh water which is introduced through the supply pipe 41, some of the water resulting from melting of ice in the cooler 9 may be returned through a pipe 50 and an associated valve 51 to the spray ring 40.

The centrifuge 37 delivers liquid concentrate and small amounts of carrier into a decant chamber 52, wherein the water-immiscible carrier, shown as being lighter than water, and the liquid concentrate are allowed to separate into layers. The carrier layer is fed to the end of the conduit 31 feeding the pump 32 through a line 53, which may include a small booster pump 54 as shown in FIGS. 1 and 2. This relatively small flow of decanted carrier then mixes with the main flow of carrier traveling through the conduit 31 from the tank 21, thus avoiding loss or waste of the carrier. The heavier liquid concentrate layer that forms at the bottom of the decant chamber 52 is propelled by a pump 55 through a pipe 56 to a three way control valve 57. The valve 57 is used to conduct the liquid concentrate either to a return pipe 58 that leads back through a control valve 59 to a connection with the inlet feed line 10, and hence to the spray assembly 12 for re-entry to the freezing zone of the column 7 for retreatment, or to a reheater 60. The reheater 60 raises the temperature of the cold liquid concentrate and is utilized primarily when treating an aqueous liquid, such as sulphite liquor, that has such a consistency that it requires heat in order to maintain it in relatively fluent condition, or which is going to be subject to further treatment, not involved in this invention, that requires higher temperatures. By utilizing the return pipe 58 to mix some concentrate with incoming fresh aqueous liquid the resultant composite aqueous liquid entering the vessel 1 is of a higher solids content than when fresh liquid alone enters from the feed line 10, and as a result retreatment can give higher concentrations of the final liquid product. As an alternative to feeding the liquid concentrate into the return pipe 58 or the reheater 60 it may be directly discharged from the apparatus, as when treating salt water and the concentrate is either waste or may be further processed.

Well known refrigeration equipment may be used for cooling the water-immiscible carrier to the low temperature required in the freezing column 7, and besides the condenser 49 it comprises a compressor 61 and an evaporator 62. Only the evaporator 62 of the refrigeration equipment is shown in FIGS. 2–5. It is important to note that although this refrigerating unit preferably utilizes highly volatile refrigerant, such as Freon, this refrigerant is completely sealed from direct contact with the carrier, so that neither the carrier or the finally separated water and liquid concentrate can be contaminated by the refrigerant, and conversely the refrigerant will not be contaminated by the other materials. In addition, there will be no chemical reaction between the refrigerant and the other materials in the system, and no loss of any of these substances will occur by reason of intermixing. The sealing off of the volatile refrigerant also eliminates the problems of separation and recapture had when such refrigerant is directly mixed with the aqueous liquid being treated, and further, maintenance of apparatus is reduced when the refrigerant is separately confined as herein described.

The compressor 61 is operable to receive spent refrigerant gas from one end portion of the evaporator 62 and to deliver the same to the condenser 49, wherein the compressed refrigerant is converted into liquid refrigerant which is discharged into the opposite end portion of the evaporator 62 in regulated quantities sufficient to cool the carrier delivered by the pump 32 to the required cold temperature. The carrier received by the pump 32 from the tank 21 and decant chamber 52 is pumped through the evaporator 62 and is thus delivered in cold condition through the conduit 16 into the vessel 1.

The ice slurry flowing out of the initial cooler 9 through the pipe 48 is delivered into the condenser 49 for condensing the refrigerant, and it is completely melted and discharged from the condenser 49 through a pipe 63 which leads to the reheater 60 for heating the liquid concentrate. If the reheater 60 is not used the pipe 63 will connect direct with the water product discharge pipe 64.

In the event the slush ice delivered by the pipe 48 is not sufficient to condense all of the refrigerant admitted to the condenser 49, supplementary cold water may be supplied from any suitable source through a pipe 65 and a control valve 66 associated therewith. This source of supplementary cooling water is also utilized when starting up the apparatus to condense the refrigerant while the water-immiscible carrier is being cooled before any ice 17 is developed in the vessel 1. The pipe 65 and valve 66 have been omitted in FIGS. 2–5 for clarity of the figures, and if desired these elements may feed a separate cooling jacket on the condenser 49, so as to be independent of the pipe 48.

In describing the apparatus of FIGS. 2–5, and its replication in the simplified flow diagram of FIG. 1, operation of the parts has been described to clarify their nature and interrelation. A summary of major aspects of the operation as a whole may now be undertaken.

First, a continuous circulation of the water-immiscible carrier is maintained in the closed system comprising the evaporator 62, the conduit 16, the vessel 1, the tank 21 wherein the liquid flows over the submerged weir 27, the return conduit 31 and pump 32. The carrier has a freezing temperature well below that of water, and it also preferably has a density less than ice or the aqueous liquid, so that the ice particles and liquid concentrate will readily flow with the carrier without rising to the surface and settling out.

By being water-immiscible the carrier will readily separate from the aqueous liquid, if permitted to stand, although a heterogeneous mixing with ice and aqueous liquid is achieved in the stream of flow through the freezing zone. Such mixing enables the carrier to rapidly absorb heat from the aqueous liquid, but by virtue of the immiscibility the two liquids are readily separated near the end of the freezing zone, so that the carrier continues its stream like flow without undue delay. Thus, heat loss in the circulation of the carrier is minimal. Further, there is little, if any, loss of carrier, so that there is no problem of replenishment.

The vessel 1 is of much larger cross section than the feed conduit 16, and the flow rate of the carrier in the column 7 is such that it advances through the vessel 1 continuously as a body which has a supply sufficient to maintain the freezing zone to capacity without any introduction of aqueous liquid to be treated. Further, the advancing body of carrier flows as a stream having physical continuity through the freezing zone, without the bulk being broken up or subdivided into discrete, isolated quantities upon introduction of the aqueous liquid. Thus, the carrier flows as a stream that engulfs aqueous liquid, and the aqueous liquid rather than the carrier becomes separated into individual bodies that are enveloped and surrounded by the other liquid.

The aqueous liquid is introduced as a spray into the stream of carrier in much lesser amounts. By becoming subdivided and engulfed the heat transfer to the carrier is rapid, so that the temperature of the aqueous liquid quickly falls and the heat of fusion is given up to develop ice particles within a very brief time. The ice particles and resulting aqueous liquid concentrate are entrained by the flow of carrier to be carried and moved along therewith, and in actual operation it may be observed that the ice particles will descend in the vessel 1 somewhat faster than the carrier because of their greater density.

The ice particles obtained in practicing this invention are relatively large and solid in character. This is of particular advantage, for they can be handled with usual, commercial centrifuges, and they do not melt before separation is accomplished. The particles are of random configuration, and they vary in size, but a substantial growth up to one-eighth inch and more in cross dimension is achieved in substantial quantities.

The ice particles flowing with the carrier collect upon the upper side of the belt conveyor 22 and are screened from the carrier. The concentrated aqueous liquid also is screened out, and only the water-immiscible carrier passes through the mesh of the conveyor. For this purpose a fine mesh wire screen of approximately 60 to 70 openings per inch may be selected, and it is believed that the reason in part why the carrier alone passes the screen is that the surface tension of the carrier is less than that of water or liquid concentrate. In the event any minute ice particles or droplets of aqueous liquid concentrate pass through the conveyor 22 they will settle toward the drain line 34 and only the lighter carrier will flow over the weir 27, so that it is decanted from the tank 21.

Since the carrier is quickly retrieved from the heterogeneous mixture, and is delivered promptly to the vessel 1 after recooling in the evaporator 62, the heat intake due to circulation is not great. Further, since the flow rate of the carrier is greater than that of the aqueous liquid, so as to be the predominant liquid, its temperature rise in cooling the aqueous liquid and absorbing the heat of fusion for the ice particles formed is not large. Consequently the temperature spread for the carrier between maximum and minimum values for entering and leaving the evaporator 62 can be confined to within less than ten degrees, and a lower spread of within five degrees is attainable. By having such a low temperature spread the differential for the refrigerant between the pressure and suction ends of the evaporator is reduced, with consequent reduction in compressor horsepower requirements. In addition, greater savings are had by feeding the ice slurry, which will be at 32° F., to the condenser 49. The temperature reduction in the condenser 49 is thereby improved upon, over that of a higher temperature coolant, and the horsepower requirement for the compressor 61 is accordingly further reduced.

The following is an example of conditions of operation for the apparatus of FIGS. 1–5 in treating a sulfite liquor derived from paper mill digesters. A hydrocarbon on the order of a highly refined kerosene is used as the carrier and is fed into the vessel 1, from the manifold 18, at a temperature of 24° F. at a rate of 15,580 pounds per minute. The descent of the carrier through the vessel 1 is about 6.4 feet per minute. Sulfite liquor having a 9 percent solids content is fed into the initial cooler 9 at 75° F. and leaves the cooler to enter the vessel 1 through the spray assembly 12 at 35° F. and at a rate of 289 pounds per minute. The temperature of the mixed liquids in the vessel 1 stabilizes at about 26° F. and the descent of the ice particles is faster than that of the carrier. The ice and liquid concentrate are removed by the belt conveyor 22, so that the temperature of the carrier leaving the tank 21 is approximately 27° F.

The temperature rise for the ice slurry derived from the centrifuge 37 is a little greater than five degrees, so that the temperature of the slurry being fed through the pipe 19 into the initial cooler is approximately 32° F. This cooling slurry has its ice content materially reduced in passing through the initial cooler, so that water content may double that of the ice while the temperature remains at 32° F. for entry into the condenser 49. From the condenser 49 it leaves as water at about 80° F.

The liquid concentrate is delivered by the centrifuge 37, and thence from the decant chamber 52, at a rate of 158 pounds per minute, and if it passes through the reheater its temperature may be raised to as high as 77° F. The amount of water removal from the sulfite liquor in this example of the process is approximately 50 percent, and the ratio of flow rate of carrier to aqueous liquid was about 53.2 to 1, but this ratio may vary considerably. The ratio does, however, illustrate the nature of the carrier as a stream that engulfs the liquid to be treated.

Referring now to FIG. 6, there is illustrated a flow diagram of a modified apparatus for exploiting the present invention which utilizes the same freezing step as the apparatus of FIGS. 1–5 but differs therefrom principally in the manner of separating the constituents of the descending column of liquids and ice particles within a cylindrical vessel. Thus much of the apparatus shown in FIG. 6 performs the same function as that shown in FIGS. 1–5 and, therefore, operation of duplicated portions of the system will not be repeated below and the same reference characters are used in FIG. 6 to designate corresponding elements described above.

In FIG. 6 there is shown a cylindrical vessel 69 closed at its top into which aqueous liquid and water-immiscible liquid carrier are fed through spray assembly 12 and annular manifold 18, respectively, to produce a descending liquid column 7 comprising a mixture of ice particles 17, carrier and concentrated aqueous liquid. The column 7 stands at a level beneath the spray assembly 12 to have a space 70 within the vessel 69 similar to the space in the apparatus of FIGS. 1–5. During the descent of the mixture of carrier, ice particles and concentrated aqueous liquid within the vessel 69, the ice particles and the concentrated aqueous liquid attain a higher velocity than the carrier, when the carrier has a lower specific gravity than the aqueous liquid. Thus, the carrier may descend at a rate of about four to seven feet per minute whereas the ice particles and concentrated aqueous liquid may descend at about nine to twelve feet per minute, which velocity differential effect appears to be due principally to the fact that the ice particles and concentrated aqueous liquid are more dense than the carrier. The apparatus of FIG. 6 can utilize this velocity differential for separating carrier from the ice particles and concentrated aqueous liquid. To this end, the lower portion of the vessel 69 is arranged for decreasing the downward velocity of the carrier, such arrangement comprising an enlargement in the diameter of the vessel together with a short annular baffle 71 which extends from the inner side of the wall of the vessel and a series of circumferentially spaced outlet openings 72 in the vessel wall that are located behind the baffle 71. The openings 72 are surrounded by a withdrawal manifold 73 extending about the exterior of the vessel which may be constructed similar to the annular manifold 18 described above. A carrier withdrawal conduit 74 communicates with the withdrawal manifold 73 and is connected to a suitable pump 75. Beneath the diametrically enlarged lower portion, the vessel 69 tapers inwardly to form a conical hopper 76 that is connected to a pump 77 through a downwardly extending outlet pipe 78 disposed at the apex of the hopper.

As the carrier descends in the column 7 it will move into the region of the diametrically enlarged portion and then flow sidewardly toward the outlet openings 72. The downward component of carrier velocity will decrease, and the heavier, more rapidly descending ice particles and concentrated aqueous liquid will continue to move downwardly, although their velocity may also decrease by reason of the diminished downward flow of the carrier. The ice and concentrate will separate from the sideward flow of carrier and will descend downwardly past the baffle 71 into the conical hopper 76. Some of the carrier may also descend into the hopper 76, but this will be separated out from the ice and concentrate in a subsequent step in the process.

Carrier withdrawn through the openings 72 into the withdrawn manifold 73, and then through the carrier withdrawal pipe 74 under the action of the pump 75, is fed through the evaporator 62 for re-cooling and recirculation through the vessel 69, as previously described. The ice, concentrate and small amount of carrier entering the hopper 76 feeds into the outlet pipe 78 to the inlet of the pump 77. The outlet of the pump 77 is connected to a discharge pipe 79 through which the ice and liquids removed through the outlet pipe 78 flow to the centrifuge 37 for separation of the ice particles. The liquids discharged from the centrifuge 37 are fed to the decant chamber 52 to permit the separation of the concentrated aqueous liquid from whatever carrier may have descended past the baffle 71. The separated carrier and concentrated aqueous liquid may then be utilized as desired. The discharge pipe 79 is provided with a control valve 80 so as to permit control of the liquid flow through the pipe 79.

It is also contemplated that the air pressure in the space 70 at the top of the vessel 69 may be controlled in order to facilitate operation of this embodiment; thus the space 70 may be subjected to atmospheric pressure or a pressure either above or below atmospheric. In the drawing, a pressure system is shown comprising a pressure pump 81 connected to a pressure line 82 communicating with the space 70, the line 82 being provided with a suitable control valve 83, and the pressure provides control over the movement of materials through the vessel.

The proper operation of the process shown in FIG. 6 will depend to a large extent on maintaining suitable control and relative adjustment of the rates of flow of the aqueous liquid and carrier input streams to the vessel 69, the rate of withdrawal of carrier through the carrier withdrawal conduit 74 and the rate of discharge of ice particles and concentrated aqueous liquid through the discharge pipe 79. The shape of the lower portion of the vessel 69 and the position of the baffle 71 are also important and the baffle may be made adjustable to permit control over its action. It is expected that suitable means for slowing the descent of the moving mixture other than the specific construction shown herein may also be devised.

Referring now to FIG. 7, there is illustrated still another form of apparatus which may be useful in the practice of this invention. The embodiment of FIG. 7 uses the same freezing steps of the two above embodiments of this invention, namely the intimate contact of an aqueous liquid feed with a water-immiscible liquid cooled to an ice-forming temperature so as to freeze water from the feed. The water-immiscible liquid also acts as a carrier to aid in the transport of the ice and concentrated aqueous liquid through the system. However, this embodiment includes alternate separation steps which may be useful in some applications of this invention. The apparatus of FIG. 7 will be described with reference to the treatment or concentration of sulphite liquor (or black liquor) derived from paper mill digesters, hereinbelow generally referred to as liquor. It is understood that sulphite liquor is a type of aqueous liquid that may be effectively treated with the processes and apparatus of this invention and that the embodiment of FIG. 7 may also be used to treat other aqueous liquids.

The apparatus diagrammatically depicted in FIG. 7 comprises in general, a supply tank 90 having a hot liquor inlet 91 and being connected at its upper end with a barometric condenser 92 having a vapor outlet 93, and at its lower end with a liquor discharge conduit 94 communicating with a liquor circulating pump 95 past a centrifugal pump 96; and a vessel or casing 97 enclosing an initial or main freezing zone 98 which communicates at one end with the discharge line 99 of the pump 95 extending through a refrigerated heat exchanger 100, and at its opposite end with a circulating pump 101, while its lower portion has an inlet conduit 102 for cold water-immiscible liquid having a freezing point below that liquor and which may be connected by a branch pipe 103 to the inlet line 104 of the pump 95. An initial centrifugal or other mechanical separator 105 communicates with the pump 101 and is adapted to separate ice from the mixed chemical liquor and water-immiscible liquid delivered from the initial freezing zone 98, and to deliver the separated ice by gravity into a receptacle 106 through a spout 107; and another casing 108 enclosing a secondary freezing zone 109 communicates at one end with the separator 105 through a separated liquid discharge line 110 passing through another low temperature refrigerated heat exchanger 111, and at its opposite end with another circulating pump 112. A secondary centrifugal separator 113 communicates with the pump 112 and is adapted to separate congealed sulphite liquid from the carrier liquid constituting the mixture passing through the secondary freezing zone 109, and to deliver the congealed and concentrated chemical liquor alone by gravity into a tank 114 through a down-spout 115; and a liquid discharge conduit 116 for the secondary separator 113 communicates with the inlet conduit 102 of the initial freezing zone 98 past a circulating pump 117; while a cold water return duct 118 connects the condenser 92 with a liquid discharge pipe 119 communicating with the receptacle 106, past another circulating pump 120.

The tank 90, condenser 92, and casing 97 constituting the initial portion of the system, may be of any suitable and available type and the barometric condenser 92 is adapted to create a high vacuum within the tank 90 and to initially remove some vapor and sulphur dioxide gas from the hot chemical liquor admitted to the supply tank 90. The various pumps 95, 96, 101, 112, 117, 120 may also be of any commercially available types adapted to perform the duties for which they are intended, and the branch pipe 103 which connects the conduit 102 with the inlet line 104 of the liquor circulating pump 95, is preferably provided with a valve 121 for controlling the quantity of cold carrier liquid which is by-passed through this pump around the freezing zone 98 to maintain precise temperatures in the system. The refrigerating units or heat exchangers 100, 111 may also be of well known construction preferably controllable independently of each other, and the heat exchanger 100 which may be used to initially cool the hot liquor has a lower liquid refrigerant inlet 122 and an upper gaseous refrigerant outlet 123, while the secondary low temperature heat exchanger 111 which cools the immiscible carrier liquid has a lower liquid refrigerant inlet 124 and an upper gaseous refrigerant outlet 125.

The chemical liquor conducting line 99 which connects the pump 95 with the initial freezing zone 98 may be provided at its delivery end within this zone, with a suitable injection device 126 preferably adapted to introduce the chemical liquor into the zone 98 without excessive agitation, while the delivery end of the mixture conducting line 110 connecting the initial separator 105 with the secondary low temperature freezing zone 109 may also be provided within this latter zone with a similar injection device 127. The water-immiscible liquid used to fill the zones 98, 109 may be any relatively non-volatile liquid in which the chemical of the liquor is insoluble and which has a freezing point below that of the chemical liquor and is merely adapted to mix with such liquor without chemically combining with the ingredients thereof. The receptacle 106 may be provided with a heater such as a heating coil 128 for melting the ice particles delivered thereto from the initial separator 105 through the spout 107, and the concentrated liquor receiving tank 114 may likewise be provided with a heater such as a heating coil 129 for melting the frozen concentrate or chemical so that it may be readily withdrawn by a pump 130 and delivered to the boilers or other place of final disposal.

The centrifugal separators 105, 113 may be of any type adapted to effectively mechanically separate suspended solids such as ice particles from liquid with which the solids are mixed, and to maintain the system under approximately atmospheric pressure. As shown each of these separators 105, 113 has a frusto-conical rotor 131 provided with helical peripheral solids conducting vanes 132 and which is revolvable at high speed within an annular downwardly tapered screen 133 surrounded by liquid guiding plates 134. The ice discharge vanes 132 of the initial separator 105 communicate with the spout 107, while the ice discharge vanes 132 of the secondary separator 113 communicate with the down-spout 115; and the liquid guiding plates 134 of the initial separator 105 communicate with the liquid line 110, while the plates 134 of the secondary separator 113 communicate with the liquid line 116. The liquid discharge line 110 of the initial separator 105 may also be provided with a sulphur dioxide gas release connection and automatic valve 135, and the upper end of the congealed sulphite down-spout 115 may likewise be provided with a sulphur dioxide gas escape connection and automatic valve 136, thus substantially completing the system for exploiting the present improved sulphite liquor concentrating method in two successive similar stages.

During normal operation of the system while carrying on the improved concentration process, an abundant supply of sulphite or other chemical liquor containing excess moisture or water is being continuously delivered into the tank 90 through the inlet 91 and the barometric condenser 92 is functioning to remove vapor and some sulphur dioxide gas if the liquor is hot while the pumps 95, 96 are operating to withdraw fresh liquor from the tank 90 through the conduit 94 and pipe line 104. The admitted chemical liquor is thus partially dehydrated, and the pump 96 functions to deliver the liquor under pressure through the initial refrigerated heat exchanger 100 wherein the temperature of the liquor may but is not necessarily reduced below 32° F. the normal freezing point of water. Preferably the liquor is cooled in the heat exchanger 100 sufficiently above the temperature at which ice will form so as to inhibit freeze-up of the orifices in the injection device 126. The cooled liquor is then preferably injected under relatively high pressure but without excessive agitation through the device 126 into the initial zone 98 which is filled with cold water-immiscible liquid derived from a final separator 113, and which has been cooled to an ice-forming temperature in the secondary refrigerated heat exchanger 111; and this immiscible liquid thoroughly mixes with the cooled injected liquor, thus producing a cold mixture having a temperature below 32° F. so that considerable water in the mixture is thus congealed and converted into snow or ice particles.

The circulating pump 101 thereafter functions to withdraw the fluent mixture of ice crystals suspended in other liquids from within the zone 98 and delivers the same into the initial centrifugal separator 105 which mechanically and automatically removes the ice from the mixed sulphite liquor and immiscible liquid constituents of the mixture, and delivers the removed ice crystals through the spout 107 into the receptacle 106 wherein the heater 128 promptly melts the ice and converts it into cold water. The circulating pump 120 thereafter constantly withdraws the cold water from the receptacle 106 through the pipe 119 and delivers it through the duct 118 into the barometric condenser 92 where this water is utilized to constantly condense other chemical vapor arising from the hot liquor supply tank 90. The cold liquid mixture discharged from the initial separator 105 flows under approximately atmospheric pressure through the discharge line 110 and the valve 135 then permits free sulphur dioxide gas to escape, while the mixed sulphite and other immiscible liquid passes through the secondary refrigerated heat exchanger 111 wherein its temperature is further reduced below the freezing point of the chemical liquor but still above the freezing point of the immiscible liquid.

This further cooled mixture is thereafter injected into and fills the secondary freezing zone 109 wherein the remaining chemical liquor alone is congealed and converted into snow or ice particles, and the cold mixture of immiscible liquid and congealed chemical liquor is subsequently constantly withdrawn from the secondary zone 109 and is delivered into the secondary centrifugal separator 113 by the circulating pump 112. This separator 113 mechanically and automatically removes the congealed chemical liquor from the immiscible liquid of the mixture admitted thereto, and delivers the chemical liquor in highly concentrated condition through the down-spout 115 into the tank 114 wherein the congealed liquor is promptly melted and from which the concentrated chemical in the form of a slurry may be withdrawn by the pump 130 and delivered to the place of ultimate disposal. The cold immiscible liquid separated from the sulphite by the separator 113 and which still has a temperature well below 32° F., is withdrawn by the circulating pump 117 through the conduit 116 and is delivered through the return conduit 102 into the initial freezing zone 98 where it mingles with the pre-cooled chemical liquor passing through the refrigerated heat exchanger 100 to produce a mixture sufficiently cold to freeze water, but regulated quantities of this immiscible liquid also may be introduced through the branch pipe 103 and past the control valve 121 into the inlet line 104 leading to the pump 95, in order to regulate the temperature of the liquor admitted to the pump 95.

Any sulphur dioxide vapors remaining in the system after the sulphite liquor has been finally concentrated may escape past the automatic valve 136, and these vapors together with those escaping past the other automatic valve 135 and from the condenser 92 may be collected in any suitable manner and subsequently condensed. The refrigerant may also be circulated through the heat exchangers 100, 111 in a well-known manner, and controlled to produce the desired water and chemical freezing temperatures within the respective zones 98, 109, and sufficient other immiscible liquid should be provided to constantly maintain the enclosed circulating system substantially filled with liquid and relatively devoid of free air. In order to maintain the proper temperatures within the freezing zones, the two refrigerated heat exchangers 100, 111 should preferably be operated so as to reduce the temperature of the liquor admitted to the initial zone 98 to approximately 32° F., and to thereafter further reduce the temperature of the dehydrated mixture admitted to the final zone 109 below the freezing temperature of the chemical liquor, thus producing immiscible carrier liquid returned for recirculation from the separator 113 to the zone 98 having a temperature somewhat below 32° F. It is also noteworthy that the initial cooling of the liquor admitted to the zone 98 may be dispensed with if the fresh liquor is relatively cold.

When treating chemical liquor derived from paper mills and which contains approximately nine parts of water to one part of the chemical, it is desirable to remove from 30% to 50% of the water in the initial freezing zone 98, and it has been found that maintaining a thorough mixture within this zone 98 at a temperature of approximately 26° F. will accomplish this result. This will permit the partially dehydrated liquor to be handled as a slurry for fuel in the boilers; and while the final separation of the liquor from the insoluble liquid in order to produce such partially dehydrated liquor has been shown in the drawing as having been effected in a second refrigeration zone 108, such separation may also be effectively accomplished by decantation due to differences in specific gravity of the immiscible liquid and of the heavier liquor.

Several embodiments of the present invention have been described, each of which utilizes the same basic method of freezing water from an aqueous liquid. In each embodiment shown there is provided a moving or circulating stream of water-immiscible liquid carrier which is cooled to an ice-forming temperature and caused to flow through a freezing zone as a stream. Aqueous liquid feed to be treated is fed into this moving stream of carrier so as to become engulfed thereby and permit the transfer of heat from the aqueous liquid to the carrier and cause the freezing of ice particles from the aqueous liquid. It is contemplated that a wide variety of carrier liquids are suitable for the practice of this invention, including, but not limited to, mineral oil, deodorized mineral oil, highly-refined kerosene, various hydrocarbons and synthetic liquids such as silicones and the like. The use of a relatively non-volatile liquid carrier will reduce fire and explosion hazards. The invention may be most effectively utilized if the carrier has a different density from the aqueous liquid being treated, preferably less, in order to facilitate its separation, and in addition, it should have a freezing temperature below that of water. Although there should be a minimum of mass transfer between the aqueous liquid feed and the water-immiscible liquid carrier, to prevent contamination of either liquid by the other, the invention may still be effectively utilized if there is a minor amount of such mass transfer, and the phrase water-immiscible means that the carrier is substantially but not necessarily completely immiscible with water. Preferably, the quantity of carrier circulated in the system is considerably greater than the quantity of aqueous liquid feed so that there will be a minimum of temperature change in the liquid carrier as it freezes water from the feed. This enhances the control of the temperatures in the freezing zone and also minimizes the refrigeration required to re-cool the stream of carrier after it has been separated for recirculation.

While sulfite liquor has been particularly illustrated as an aqueous liquid being treated in the above description, the present invention may also be utilized to treat other aqueous liquids such as chemical liquors, brackish water, saline water, fruit juices, etc. The term aqueous liquid refers to any liquid which includes a substantial amount of water together with solid material. The solids will generally be dissolved in the water, although a portion of the solids content may also be suspended in the water. If this liquid has a very large amount of solids, it may be preferable to screen or filter the feed prior to treatment. The invention is not to be limited to any particular liquids, but is to be extended to any that may be treated by the process or apparatus described, and in the claims the term aqueous liquid is to be given its broadest meaning consistent with the invention, and in instances may include liquids mixed with liquids and solvents other than water.

The type of aqueous liquid treated will to some extent determine the choice of liquid carrier to be used as the freezing agent, particularly when a portion of the aqueous liquid, either the separated ice or concentrated aqueous liquid, is to be ultimately used for human consumption. The aqueous liquid to be treated is preferably added to the stream of cold carrier as a spray characterized by thin, hair-like, low pressure jets, although it may also be added in some other manner. It is believed desirable from operation, however, that jets be fed which are continuous, and not broken up into droplet or similar form, in order to promote the formation of large size ice particles. The pressure at which the aqueous liquid is added to the moving stream of water-immiscible liquid carrier should be such as to inhibit emulsification of the feed when treating aqueous liquids in which emulsification is a problem. As the aqueous liquid is added to the moving stream of carrier, ice particles are formed therefrom and the ice particles and concentrated aqueous liquid feed are carried through the freezing zone by the moving stream of carrier. The agitation or turbulence in the freezing zone should be held to a minimum in order to prevent emulsification of the aqueous liquid feed and the liquid carrier.

After passing through the freezing zone, the mixture of ice particles, concentrated aqueous liquid feed and water-immiscible liquid carrier is separated into its respective components. One of the features of this invention is the ease with which this separation may be accomplished. The separated carrier is re-cooled and re-circulated through the freezing zone. The separated concentrated aqueous liquid may be returned through the freezing zone for further concentration or discharged from the apparatus, with or without reheating, for disposal as waste or further treatment. If sea water, for example, is treated by the process of this invention, the concentrated sea water may be processed to recover compounds or elements dissolved in the sea water. The separated ice may be withdrawn for discharge or further treatment to provide potable water or water for use in other processes.

Preferably, the ice removed from the aqueous liquid feed is made into an ice slurry that is utilized to pre-cool aqueous liquid feed entering the system and/or to condense refrigerant used to cool the carrier, and thereby effect significant operating economies. The immiscible nature of the liquid carrier freezing agent enhances the ease and rapidity of the separation steps. A number of suitable separation techniques are shown in the three embodiments described above and it is expected that other separation methods may be used; the order in which the three mixture constituents, i.e. ice particles, concentrated aqueous liquid and liquid carrier, are separated from one another may be varied as desired. It has been found that another advantage of the process of this invention is that it is capable of producing large ice particles which may be readily separated by centrifuges of known design and ready availability in contradistinction to other freezing techniques which often produce ice particles of such small size as to require specially-designed centrifuges for their separation.

Another distinct advantage of the present invention is that it may be carried out at or very near to atmospheric pressure. This eliminates the need for expensive and bulky high-pressure equipment such as is required by some refrigeration techniques for removing water that use a vaporizable refrigerant as a freezing medium and operate under pressures as high as 30–35 atmospheres or higher. Thus it is expected that the various pumps, valves, piping, vessels and centrifuges suitable for use in apparatus of this invention need not be specially designed and adapted for operation at high pressures.

Another advantage is the use of a freezing temperature only a few degrees below the freezing point of the water being removed. 26° F. has been found to be a desirable temperature for the freezing zone, and since the carrier may be within approximately fifteen degrees of the freezing point the accompanying refrigeration apparatus need not work at extremely low temperatures. Another advantage is that low enough temperatures are maintained from the initial cooler to the reheater to reduce causticity and corrosion that would be encountered at higher temperatures from feeds such as spent sulfite liquor or salt water.

While three embodiments of this invention have been described in detail in order to enable those skilled in the art to practice this invention, it is understood that other embodiments of the invention may be used and that changes may be made in the embodiments described hereinabove by those skilled in the art without departing from the scope of the present invention. The true scope of the present invention is best defined by the appended claims and limitations set out in the above detailed description are not to be taken in a limiting sense except insofar as they are incorporated in the claims.

I claim:

1. The method of treating an aqueous liquid comprising: advancing a body of a water-immiscible carrier liquid cooled to an ice-forming temperature through a freezing zone as an uninterrupted flowing stream having physical continuity through the zone; introducing an aqueous liquid into the stream of carrier liquid wherein the aqueous liquid becomes engulfed by and mixed with the carrier liquid and is carried by and moved along therewith through the freezing zone to form a heterogeneous mixture comprising a carrier liquid phase, a partially concentrated aqueous liquid phase, and solid ice particles formed from the water of the aqueous liquid; and separating the constituents of the resultant mixture.

2. The method of claim 1 in which the flow rate of the water-immiscible carrier liquid through the freezing zone is greater than the flow rate of the aqueous liquid through such zone.

3. The method of claim 1 in which the temperature of the water-immiscible carrier liquid at the end of the ice forming freezing zone is within ten degrees Fahrenheit of the temperature at the commencement of the zone.

4. The method of claim 1 in which the separation of the constituents includes removal of said ice and partially concentrated liquid phases together with some carrier liquid from the stream of carrier liquid, and thereafter separating out the carrier liquid and returning the same to said stream.

5. The method of claim 1 in which the separation provides ice particles that are utilized to cool incoming aqueous liquid and also provides carrier liquid that is recooled and then used to treat further aqueous liquid.

6. The method of treating an aqueous liquid comprising: advancing predetermined amounts of a carrier liquid cooled to an ice-forming temperature through a freezing zone as a continuous stream in the form of a body of liquid; introducing a lesser quantity of an aqueous liquid into the carrier in the freezing zone to become subdivided into numerous small amounts that are engulfed and mixed with the carrier to form a mixture wherein the aqueous liquid is surrounded by the carrier to form ice particles and liquid concentrate that flow along with the stream of carrier liquid; and separating the constituents of the resultant mixture by a screening in which carrier liquid flows through a screen and ice particles and liquid concentrate are collected on the screen and removed from the stream of carrier liquid.

7. The method of claim 6 in which the ice particles and remaining aqueous liquid are placed in a centrifuge to be separated from one another.

8. The method of treating an aqueous liquid comprising: advancing predetermined amounts of a carrier liquid cooled to an ice-forming temperature through a freezing zone as a continuous stream in the form of a body of liquid; introducing a quantity of an aqueous liquid into the carrier liquid in the freezing zone in lesser amounts than the carrier liquid to have the aqueous liquid become engulfed by and mixed with the carrier to form a mixture wherein the aqueous liquid is surrounded by the carrier to form ice particles and liquid concentrate that flow along with the stream of carrier liquid; said aqueous liquid being of higher specific gravity than the carrier liquid so that the ice particles and aqueous liquid concentrate flow through the freezing zone faster than said carrier liquid; and separating the constituents by changing the direction of flow of the bulk of the carrier at a point downstream from the formation of said ice particles to diminish its velocity in the initial direction of flow, while the ice particles and liquid concentrate continue to flow in the initial direction; and collecting the ice particles and liquid concentrate after their departure from the bulk of the carrier.

9. The method of removing water from an aqueous liquid comprising: advancing a downwardly flowing stream of a carrier liquid coled to an ice-forming temperature through a confined space; controlling the level of the carrier liquid as it advances downward through the confined space to provide a freezing zone including a physically uninterrupted descending stream of the carrier liquid; introducing aqueous liquid of greater density than the carrier liquid into the freezing zone to therein become engulfed and intermixed with the carrier liquid so as to freeze at least a part of the water from the aqueous liquid to thereby form an advancing mixture of ice particles, carrier liquid and concentrated aqueous liquid in which the ice particles and concentrate flow with the carrier; and separating the constituents of said mixture.

10. The method of removing water from an aqueous liquid comprising: advancing a downwardly flowing stream of a water-immiscible liquid cooled to an ice-forming temperature through a confined space; controlling the level of the water-immiscible liquid as it advances downward through the confined space to provide therein a freezing zone including an uninterrupted descending stream of the water-immiscible liquid and an air space overlying the freezing zone; introducing aqueous liquid into the freezing zone through the air space to become engulfed and intermixed with the water-immiscible liquid in the freezing zone so as to freeze at least a part of the water from the aqueous liquid to thereby form an advancing mixture of ice particles, water-immiscible liquid and partially de-watered aqueous liquid in which the ice particles and de-watered aqueous liquid flow downward with the water-immiscible carrier; and separating the constituents of said mixture.

11. The method of claim 10 in which the air space overlying the freezing zone has a regulated air pressure to aid control of the level of the water-immiscible liquid.

12. The method of removing water from an aqueous liquid comprising: circulating a stream of a water-immiscible liquid through a fluid-flow system that returns back upon itself to have a closed recirculation and having said stream remain as a liquid throughout the system; cooling the circulating water-immisible liquid to an ice-forming temperature in a refrigerating portion of the fluid-flow system; advancing the cooled circulating water-immiscible liquid through a portion of the fluid-flow system downstream from the refrigerating section to provide a freezing zone in which the moving stream of water-immiscible liquid cooled to an ice-forming temperature has an uninterrupted physical continuity through the zone; introducing aqueous liquid into the moving stream of water-immiscible liquid near the initial portion of the freezing zone to therein become engulfed and mixed with the stream of water-immiscible liquid in heat-transfer relationship so as to freeze water from the aqueous liquid and thereby form a moving heterogeneous mixture comprising a solid phase of ice particles, a water-immiscible liquid phase and a partially de-watered aqueous liquid phase; and separating said moving mixture into its constituents downstream from the initial portion of the freezing zone.

13. The method of treating a liquid having a solids content, which method comprises: moving a body of cold carrier fluid through a freezing zone as a stream having physical continuity through the zone; introducing the liquid to be treated into said carrier near the initial portion of said freezing zone in amounts per unit time substantially less than the rate of flow per unit time of said carrier, said liquid being broken-up into subdivided amounts that are engulfed in said carrier for heat transfer to the carrier and for freezing at least a portion of the liquid to produce frozen particles and liquid concentrate that flow along with said carrier; separating cold carrier from the frozen particles, recooling the carrier by passage through an evaporator of a refrigerator system, and then recirculating the carrier back to said freezing zone; separating frozen particles from liquid concentrate; and using the particles to cool further liquid to be treated and to cool refrigerant of said refrigeration system in the condenser of such system.

14. The method of concentrating chemical liquor delivered from paper mill digesters and which contains water, which method comprises, subjecting the liquor to a temperature below 32° F. while mixing the same in one zone with immiscible liquid having a freezing point below that of the liquor to produce a composite mixture containing ice suspended in the chemical and the immiscible liquid, separating the ice from the composite mixture to at least partially dehydrate said mixture, further subjecting the dehydrated mixture in another zone to a temperature sufficiently low to congeal the chemical liquor, and finally separating the congealed and concentrated chemical from said immiscible liquid.

15. A method according to claim 14 further including the step of returning the immiscible liquid to said one zone after the congealed chemical has been separated therefrom.

16. A method according to claim 14 wherein the chemical liquor is hot and the initial step comprises removing vapor from the hot liquor to partially dehydrate the liquor.

17. The method of concentrating warm chemical liquor containing water, which method comprises, initially cooling and mixing the chemical liquor with immiscible liquid having a freezing point below that of water and subjecting the mixture to a temperature below 32° F. to congeal the water, separating the chemical liquor and immiscible liquor from the ice, thereafter separating the chemical liquor from the cold immiscible liquid and re-utilizing the separated other liquid to produce subsequent cold water congealing mixture, and melting the ice and utilizing the resultant cold liquid water to initially cool the chemical liquor.

18. The method of concentrating warm chemical liquor containing water, which method comprises, mixing the chemical liquor with immiscible liquid having a freezing point below 32° F. and subjecting the mixture to a temperature below 32° F. to congeal the water, separating the chemical liquor and other liquid from the ice, thereafter separating the chemical liquor from the cold immiscible liquid and re-utilizing the separated cold liquid to produce subsequent cold water congealing mixture, and melting the ice and utilizing the resultant cold liquid water to initially remove chemical vapor from the warm liquor by condensation.

19. In an apparatus for treating an aqueous liquid to remove water therefrom by freezing, the combination comprising: a vessel having a closed top and an open bottom to provide a space within which freezing action may take place; carrier liquid inlet means opening upon the upper portion of the vessel and spaced below the closed top thereof; an aqueous liquid spray within said vessel, which spray is disposed above said carrier liquid inlet means with spray openings directed downwardly and arrayed over a major part of the cross section area of the vessel; a tank beneath said vessel and within which the open bottom of said vessel is disposed, said tank extending sidewardly from the side of the vessel; a movable screen within said tank and directly beneath the open bottom of said vessel, which screen slants upwardly to have a portion above the bottom of the vessel; and a carrier liquid outlet in said tank on the side of the screen opposite said vessel.

20. In an apparatus for treating an aqueous liquid to remove water therefrom by freezing, the combination comprising: a vessel having a closed top and an open bottom to provide a space within which freezing action may take place; carrier liquid inlet means opening upon the upper portion of the vessel and spaced below the closed top thereof; an aqueous liquid feed line entering the top of said vessel with discharge openings within the vessel that are spaced above said carrier inlet means; a tank beneath said vessel and within which the open bottom of said vessel is disposed, said tank extending sidewardly from the side of the vessel; a carrier liquid outlet leading from said tank at a point spaced from the open bottom of said vessel; a movable screen within said tank disposed between said open bottom of said vessel and said carrier liquid outlet to intercept carrier liquid flow from the vessel to the outlet, said screen leading upwardly to a point above liquid level in the tank; a centrifuge having an opening cooperatively disposed with said screen to receive ice and aqueous liquid therefrom; conduit means connecting said carrier liquid outlet with said carrier liquid inlet means; and refrigeration means interposed in said conduit means for cooling carrier liquid flowing through said conduit means.

21. In an apparatus for treating an aqueous liquid to remove water therefrom, the combination comprising: a vertically extending vessel having an upper portion and a bottom section therebeneath that includes an ice collecting hopper; carrier liquid inlet means opening upon the upper portion of the vessel and spaced below the top thereof; an aqueous liquid feed line entering the top of said vessel with discharge openings within the vessel that are spaced above said carrier inlet means; a carrier liquid outlet at the sides of said vessel in the bottom section thereof for withdrawing carrier liquid that has descended downwardly from said upper portion to thereby decrease downward velocity of the carrier liquid; baffle means protectively disposed before the entry of said discharge openings to preclude entry of ice into the carrier liquid discharge openings; a centrifuge joined with said ice collecting hopper; conduit means connecting said carrier liquid outlet with said carrier liquid inlet means; and refrigeration means interposed in said conduit means for cooling carrier liquid flowing through said conduit means.

References Cited in the file of this patent
UNITED STATES PATENTS

| | | |
|---|---|---|
| 2,666,304 | Ahrel | Jan. 19, 1954 |
| 2,751,762 | Colton | June 26, 1956 |
| 2,764,488 | Slattery | Sept. 25, 1956 |
| 2,780,281 | Reinert | Feb. 5, 1957 |
| 2,886,603 | Shelton | May 12, 1959 |
| 2,988,895 | Toulmin | June 20, 1961 |

UNITED STATES PATENT OFFICE
CERTIFICATE OF CORRECTION

Patent No. 3,098,735                          July 23, 1963

Herbert H. Clark

It is hereby certified that error appears in the above numbered patent requiring correction and that the said Letters Patent should read as corrected below.

Column 3, line 47, for "vesseel" read -- vessel --; column 4, lines 39 and 40, for "partion" read -- partition --; column 9, line 9, for "withdrawn" read -- withdrawal --; column 16, line 5, for "coled" read -- cooled --; column 17, line 1, for "refrigerator" read -- refrigeration --; line 34, for "liquor" read -- liquid --.

Signed and sealed this 7th day of April 1964.

(SEAL)
Attest:

ERNEST W. SWIDER

Attesting Officer

EDWARD J. BRENNER

Commissioner of Patents